United States Patent [19]

Warshawsky

[11] 4,322,098
[45] Mar. 30, 1982

[54] SWIVEL JOINT
[75] Inventor: Jerome Warshawsky, Baldwin Harbor, N.Y.
[73] Assignee: I. W. Industries, Inc., Melville, N.Y.
[21] Appl. No.: 204,242
[22] Filed: Oct. 31, 1980

Related U.S. Application Data
[63] Continuation of Ser. No. 38,014, May 11, 1979, abandoned.

[51] Int. Cl.³ .............................................. F16L 27/04
[52] U.S. Cl. ..................... 285/264; 285/269; 285/DIG. 8; 403/116; 403/138
[58] Field of Search ......... 285/267, 268, 269, DIG. 8, 285/264; 403/138, 116, 117

[56] References Cited
U.S. PATENT DOCUMENTS 1,452,530  4/1923  Sherbondy ...................... 403/138 X
1,871,421  8/1932  Muhlhauser et al. ............ 285/268 X
2,910,310 10/1959  Mulac ............................. 285/269 X
3,186,736  6/1965  Warshawsky ..................... 285/39
3,312,482  4/1967  Barrett et al. ...................... 285/168

FOREIGN PATENT DOCUMENTS
93052    8/1897  Austria .
1451811 10/1976  United Kingdom ................ 403/138

Primary Examiner—Andrew V. Kundrat
Attorney, Agent, or Firm—Stephen E. Feldman; Marvin Feldman

[57] ABSTRACT

A swivel assembly comprises a housing having a bore extending therethrough along a central axis. The housing has an end wall with an opening about the axis extending therethrough. A generally spherical swivel member is rotatably and swivelly disposed in the bore and includes an extension protruding through the opening. The portion of the extension within the opening is substantially smaller in transverse cross-section than the opening to permit limited swivel movement of the swivel member in the housing. The bore has first and second sections. The first section has a smaller diameter than the second section and thereby forms a wall. A stiff resilient element is provided between the wall and the swivel member for preventing movement of the spherical swivel member when subjected to a heavy load.

7 Claims, 3 Drawing Figures

SWIVEL JOINT

This is a continuation, of application Ser. No. 038,014 filed May 11, 1979 and now abandoned.

BACKGROUND OF THE INVENTION

While the invention is subject to a wide range of applications, it is especially suited for use in an electrical lighting fixture and will be particularly described in that connection.

The present invention provides an improved swivel assembly which may be used for a variety of purposes. One particularly useful application of the assembly is in an electrical lighting fixture for attaching a lamp housing to a lamp support, and thereby permits adjustment of the position of the lamp housing relative to the support. For example, one specific type of electrical lighting fixture in which the present swivel assembly may be used is a pole lamp. This lamp comprises a long supporting standard, or pole, which is normally installed in an upright position between floor and ceiling of a room. A number of lamp housings may be mounted on the pole along spaced positions and attached to the pole by means of a swivel assembly.

The electrical swivel assembly used in the lighting fixture may comprise a housing having means for attachment to the lamp support and a swivel member mounted in the housing and having means for attachment to a lamp housing. The swivel assembly has a central opening extending through the swivel housing and the swivel member for receiving the electrical conductors which carry electrical current to a lamp within the lamp housing. In some of the existing electrical swivel assemblies of this type, the swivel member has only one degree of adjustment relative to the swivel housing, i.e. typical adjustment about an axis generally normal to the longitudinal axis of the swivel housing. Often, this type of swivel assembly cannot be used as it limits the adjustment of the lamp housing relative to the lamp support. Accordingly, an improved type of electrical swivel assembly has been devised wherein the swivel member has two degrees of adjustment relative to the swivel housing, i.e., pivotal adjustment about an axis normal to the longitudinal axis of the swivel housing and rotational adjustment about the latter axis. This improved swivel assembly requires to have the angle of rotational adjustment of the swivel member to be limited in order to prevent excessive twisting of the electrical conductors which extend through the swivel assembly when it is installed on a lighting fixture. In the past, the means for limiting the angle of rotational adjustment was rather complicated and therefore expensive to manufacture and assemble. Also, the means used to limit the rotational adjustment were often not very sturdy. In addition, the previous electrical swivel assemblies often had the pivotal adjustment of the swivel member restricted to one plane. In other words, the swivel member did not have the capability of universal swivel movement relative to the swivel housing. Further, when a heavy load, such as a heavy lamp was attached to the swivel, the swivel often could not hold the lamp at the exact desired position.

U.S. Pat. No. 3,312,482 to Barrett et al, discloses for example, "an improved swivel assembly wherein the adjustment of the swivel member relative to the swivel housing is limited in a unique way which affords the swivel member with a greater degree of freedom of adjustment than are the swivel members of the existing swivel assemblies." This reference partially overcomes the prior deficiencies but requires a relatively complicated and therefore expensive structure to overcome these problems.

U.S. Pat. No. 3,186,736 to Warshawsky discloses, for example "is directed to improve swivel joint fittings for lighting fixtures through which electric wire extends". This reference illustrates a swivel which may have difficulties in supporting a heavy light assembly in a desired position.

Accordingly, it is an object of the present invention to provide an improved swivel assembly which substantially obviates one or more of the limitations and disadvantages of the described prior arrangement.

Another object of the present invention is to provide a swivel assembly which is relatively simple in construction, and economical to manufacture.

SUMMARY OF THE INVENTION

A swivel assembly comprises a housing having a bore extending therethrough along a central axis. The housing has an end wall with an opening about the axis extending therethrough. A generally spherical swivel member is rotatably and swivelly disposed in the bore and includes an extension protruding through the opening. The portion of the extension within the opening is substantially smaller in transverse cross-section than the opening to permit limited swivel movement of the swivel member in the housing. The bore has a first and second sections. The first section has a smaller diameter than the second section and thereby forms a wall. A stiff resilient element is provided between the wall and the swivel member for preventing movement of the spherical swivel member when subjected to a heavy load.

For a better understanding of the present invention, together with other and further objects thereof, reference is had to the following description, taken in connection with the accompanying drawings, while its scope will be pointed out in the appended claims.

DESCRIPTION OF THE PREFERRED EMBODIMENTS

Figure 1:
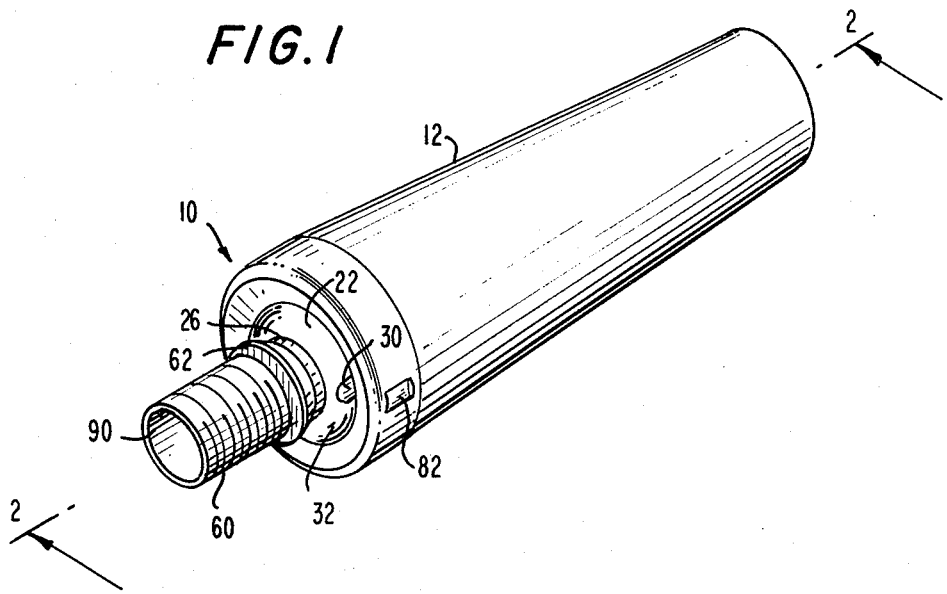
FIG. 1 is a perspective view of the improved swivel assembly.

A swivel assembly 10 comprises a housing 12 having a bore 14 extending therethrough along a central axis 16. The housing has an end wall 18 with an opening 20 about the axis extending therethrough. A generally spherical swivel member 22 is rotatably and swivelly disposed in the bore and includes an extension 24 protruding through the opening 20. The portion 26 of the extension within the opening is substantially smaller in transverse cross-section than the opening 20 to permit limited swivel movement of the swivel member 22 in the housing 12. The bore has first and second sections 44 and 40 respectively. The first section 44 has a smaller diameter than second section 40 and thereby forms a wall 46. A stiff resilient element 70 is provided between wall 46 and swivel member 22 for preventing movement of the spherical swivel member when the swivel member is subjected to a heavy load.

Figure 2:
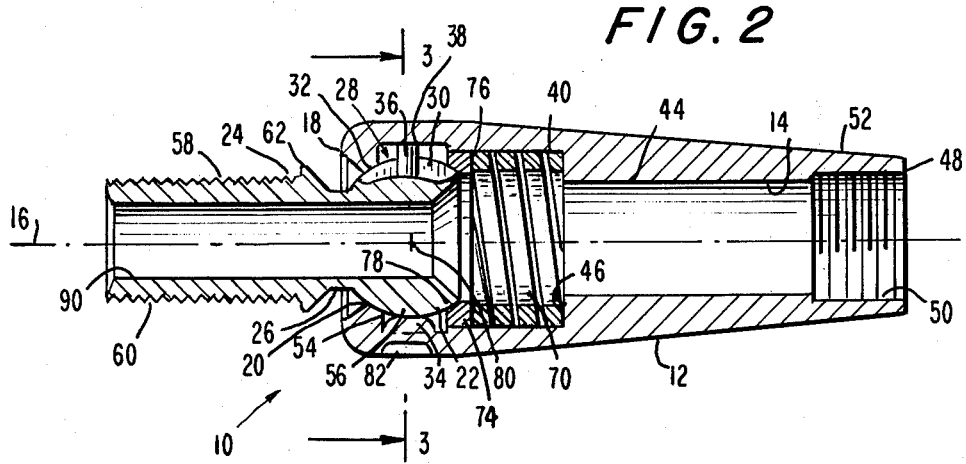
FIG. 2 is a side view in cross-section of the present invention.

Referring to FIG. 2, there is shown a swivel assembly 10 comprising a housing 12. A bore 14 extends through the housing along a central axis 16. A third section 38 of the bore begins at the end wall 18 and has a third diameter. A second section 40 adjoins the third section and has a second diameter smaller than the third diameter whereby a wall 42 is formed between the third and second sections. A first section 44 adjoins the second section and has a diameter less than the second section whereby a wall 46 is formed between the first and second sections. The first section includes a threaded bore portion 50 adjacent to the end wall 48. Although the external walls of the housing 12 are illustrated as being tapered, this is primarily a matter of design and it is within the scope of the present invention to form the outside wall 52 in any desired shape.

The end wall 18 of the housing 12 has an inner surface 54 which connects the first section 38 with the opening 20. This inner surface may be formed by bending a portion of the end of the wall forming the first section 20 or in any other desired manner.

The spherical swivel member 22 includes a generally spherically curved ball-like end 56 which is rotatably and swivelly contained within the section 38 and a reduced diameter extension 58 which extends from the spherical end 56 through the opening 20 in the swivel housing 12. The protruding end of the extension 58 is externally threaded at 60 and is formed with an external annular shoulder 62. The diameter of the extension 58 of the swivel member 22, where the extension joins the spherical end 56 of the swivel member, is substantially smaller in diameter than the diameter of the opening 20 in the swivel housing 12. This permits the swivel member to pivot relative to the swivel housing, to a limiting position where the portion 26 contacts the end wall 18.

A resilient device 70 is preferably a stiff compression spring and is seated against the wall 46. The spring yieldably urges the swivel member 22 against the inner surface 54 of the end wall 18. The spring is cylindrical and has a substantially rectangular cross-section in order to increase its stiffness. The advantages of having a stiff spring will be described hereinafter.

A washer element 74 may be provided between the spring 70 and the swivel member 22. The washer element has a flat surface 76 on one side for engaging the spring and a spherically curved inner edge 78 on the opposing side for receiving the swivel member 22. This washer performs the function of allowing the spherical member 22 to rotate with a smooth action while the spring 70 is urging the spherical member against the inner surface 54. The washer 74 is located in the bore 14 such that it is partially in the second section 40 and has at least a portion of the spherically inner edge protruding into the section 38 in order to prevent the spherical member 22 from contacting the wall 42 and thereby hampering the movement of the member 22.

The swivel assembly 10, as thus far described, provides a swivel member 22 capable of universal swivel movement in the section 38 about its center 80 of curvature, and of rotation about the central axis 16 of the swivel member, relative to the swivel housing 12.

The swivel assembly is further provided with a coacting stop structure 28 between the swivel housing 12 and the swivel member 22 for limiting rotation of the swivel member about the axis 16, relative to the swivel housing through an angle somewhat less than but approaching 360°. In addition the swivel member may undergo limited universal swivel movement relative to the housing.

Figure 3:
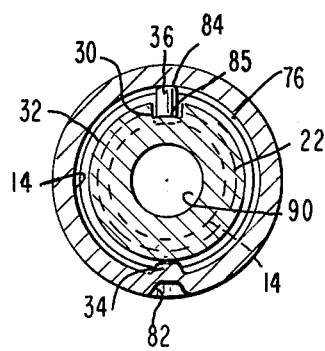
FIG. 3 is a transverse section through the swivel assembly taken on line 3—3 of FIG. 2.

The co-acting stop structure 28 includes an axially extending groove 30 in the externally curved surface 32 of the spherical swivel member 22 (see FIGS. 2 and 3).

A stop shoulder 34 projects from the surface of the bore 14. The stop shoulder is located on and is substantially the length of the section 38. The stop shoulder may be formed by any desired method such as, for example, punching an indentation 82 in the wall of the housing 12 along the section 38. The stop shoulder 34 is made relatively narrow to provide the swivel member with the greatest angle of relative rotation with respect to the housing as will be further described.

A stop element 36 may be formed of a cylindrical rod which is substantially cylindrical in shape and has two relatively flat end faces 84. One of the end faces rides in the groove 30 and seen in FIG. 3. The width of the groove 30 prevents the stop element 36 from falling over to one side. Also, one end face 84 loosely contacts the bore 14.

The stop element 36 is therefore supported and always maintains itself somewhere in the axially extending groove 30. Since the groove extends along the curved surface as illustrated in FIG. 2, the swivel member 22 is able to rotate in the section 38 and the stop element 36 will move in the groove until it contacts the inner surface 54. When the swivel member 22 is rotated about the central axis 16, the stop element 36 eventually contacts the stop shoulder 34 and prevents further rotation of the swivel member in that direction. Thus, it is apparent that the stop-shoulder 34, due to its width, limits the angle of relative rotation of the swivel member to slightly less than 360°. Also, the pivotal movement of the swivel member about the center of rotation 80 is limited by the portion 26 of the extension 58 contacting the end wall 18. Thus, it can be easily seen that the swivel assembly of the present invention provides for rotation of the swivel member relative to the housing through an angle of almost 360°. Further, the swivel member 22 is permitted limited universal swivel movement with respect to the swivel housing 12.

As mentioned earlier, the present swivel assembly is particularly useful as an electrical swivel assembly for attaching a lamp housing to a lamp support (not shown). When the swivel assembly is to be employed in such electrical applications, it is necessary to insert electrical conductors through the assembly for connection to the lamp socket in the lamp housing. To this end, the swivel member 22 in the illustrated swivel assembly is shown to have a central bore opening 90 which communicates with the bore 14 through the swivel housing 12 to define a central opening in the swivel assembly through which electrical conductors may be inserted. When mounting the swivel assembly on a lamp support, the threaded end 50 of the swivel housing 12 is connected to a threaded fastener on the lamp support. The lamp housing is connected to the threaded end 60 of the swivel member 22. When installing the present swivel assembly on the lamp support it is necessary to locate the internal stop shoulder 34 in a predetermined angular position relative to the lamp support. The positioning is easily arranged by observation of the indentation 82 on the housing body. According to the preferred practice of the invention, all the internal edges of the swivel assembly are broken or beveled as shown to prevent these edges from cutting into the electrical conductors which extend through the swivel assembly when the latter is mounted on a lamp support. When a heavy lamp is provided on end 58, the stiffness of spring 70 prevents the swivel member 22 from moving after the lamp is positioned. Further, the swivel member swivels evenly irrespective of its position. Also, a smaller more compact square spring can handle a much heavier load as opposed to an equivalent larger, bulkier round spring. Thus, the swivel joint can also remain smaller, cheaper to construct and more attractive. In addition, through repeated uses, the spring does not tend to unwind as with the round springs of the prior art.

Thus, it is obvious to one skilled in the art that a swivel assembly has been described which is relatively simple in construction, economical to manufacture, and provides universal swivel adjustment relative to the swivel housing and is rotatably adjustable relative to the housing through an angle of nearly 360°.

While there has been described what is at present considered to be the preferred embodiment of the invention, it will be obvious to those skilled in the art that various changes and modifications may be made therein, without departing from the invention, and its, therefore, aimed in the appended claims to cover all such changes and modifications as followed in the true spirit and scope of the invention.

I claim:

1. A swivel assembly, comprising:
a housing having a bore extending therethrough along a central axis, said housing having an end wall with an opening about said axis extending therethrough; a generally spherical swivel member rotatably and swivelly disposed in said bore and including an extension protruding through said opening, the portion of said extension within said opening being substantially smaller in transverse cross-section than the opening to permit limited swivel movement of said swivel member in said housing, said bore having first and second sectional walls, with said first sectional wall having a first diameter being smaller than said second sectional wall to thereby form a first wall, said first sectional wall having a threaded bore portion remote from said first wall and about said central axis; a washer element of substantially rectangular cross-section disposed in and contacting said second sectional wall and having a flat surface on one side and a spherically curved inner edge on an opposing side for co-acting with said swivel member, said washer element abutting less than a ¼ portion of said spherical swivel member; and a helical compression spring having a substantially rectangular cross-section forming flat peripheral and flat end surfaces with closely spaced coils therebetween, said spring being disposed in said bore so that the flat peripheral surface contacts the second sectional wall, one of said flat end surfaces abuts said first wall and the other flat end surface abuts the flat surface of said washer element, the diameter of said spring cross-section being substantially three fourths the diameter of the washer cross-section such that said other flat end surface engages the major portion of said flat surface of said washer element in areas of contact therewith and so forms a substantailly contiguous extension of said washer and its cross-section along said second sectional wall which enables a compact spring to handle a heavier load, while reducing its tendency to unwind, said spring providing a stiff compressive force whereby said spring remains in abutment and does not swivel; and whereby said spherical swivel member is held in position in said bore when subject to repeated movement under heavy loads.

2. The swivel assembly of claim 1 including coacting stop means between said housing and said swivel member for limiting relative rotation of said swivel member with respect to said housing to an angle approaching 360°, said coacting stop means including an axially extending groove in the externally curved surface of said spherical member, a stop shoulder projecting from the surface of said bore, and a stop element located in said groove for co-acting with said stop shoulder to limit relative rotation of said swivel member.

3. The swivel assembly of claim 2 including a third section adjoining said second section and said first end wall, and having a larger diameter than said second section, whereby a second wall is formed.

4. The swivel assembly of claim 3, wherein said second wall and said end wall limit the movement of said stop element.

5. The swivel assembly as defined in claim 4 further characterized in that said stop element is substantially cylindrical in shape and has two flat end bases whereby one of said end bases rides in said groove to permit swivel movement of said swivel member.

6. The swivel assembly as defined in claim 5 further characterized in that said stop shoulder is located on and is substantially the length of said third section.

7. The swivel assembly defined in claim 6 further characterized in that said swivel assembly has an opening extending through said housing and said swivel member through which wires may be inserted.

* * * * *